United States Patent
Padfield et al.

(10) Patent No.: US 12,406,659 B2
(45) Date of Patent: Sep. 2, 2025

(54) INVERTED PROJECTION FOR ROBUST SPEECH TRANSLATION

(71) Applicant: Google LLC, Mountain View, CA (US)

(72) Inventors: Dirk Ryan Padfield, Seattle, WA (US); Colin Andrew Cherry, Montreal (CA)

(73) Assignee: GOOGLE LLC, Mountain View, CA (US)

( * ) Notice: Subject to any disclaimer, the term of this patent is extended or adjusted under 35 U.S.C. 154(b) by 332 days.

(21) Appl. No.: 17/859,146

(22) Filed: Jul. 7, 2022

(65) Prior Publication Data

US 2023/0021824 A1  Jan. 26, 2023

Related U.S. Application Data

(60) Provisional application No. 63/224,902, filed on Jul. 23, 2021.

(51) Int. Cl.
*G06F 17/21* (2006.01)
*G06F 40/47* (2020.01)
(Continued)

(52) U.S. Cl.
CPC ............ *G10L 15/16* (2013.01); *G06F 40/47* (2020.01); *G10L 15/04* (2013.01); *G10L 15/063* (2013.01); *G10L 15/28* (2013.01)

(58) Field of Classification Search
CPC ........ G06F 40/47; G06F 40/44; G06F 40/237; G10L 15/26; G10L 15/063; G10L 15/04; G10L 15/28; G10L 15/16
(Continued)

(56) References Cited

U.S. PATENT DOCUMENTS 11,615,799 B2 * 3/2023 Zhu .................... G10L 15/26
  704/235
2006/0106592 A1 * 5/2006 Brockett ............ G06F 40/237
  704/1
(Continued)

FOREIGN PATENT DOCUMENTS

WO  WO-2021239631 A1 * 12/2021

OTHER PUBLICATIONS

Cho, Eunah, et al., "Punctuation Insertion for Real-time Spoken Language Translation", Institute for Anthropomatics and Robotics, Karlsruhe Institute of Technology, Germany, 2015, pp. 1-7.
(Continued)

*Primary Examiner* — Md S Elahee
(74) *Attorney, Agent, or Firm* — Gray Ice Higdon (57) ABSTRACT

The technology provides an approach to train translation models that are robust to transcription errors and punctuation errors. The approach includes introducing errors from actual automatic speech recognition and automatic punctuation systems into the source side of the machine translation training data. A method for training a machine translation model includes performing automatic speech recognition on input source audio to generate a system transcript. The method aligns a human transcript of the source audio to the system transcript, including projecting system segmentation onto the human transcript. Then the method performs segment robustness training of a machine translation model according to the aligned human and system transcripts, and performs system robustness training of the machine translation model, e.g., by injecting token errors into training data.

20 Claims, 9 Drawing Sheets

Table 6

| Training condition | HT | ASR |
|---|---|---|
| Baseline (human tokens and segments) | 30.3 | 25.4 |
| Token Robustness (ASR source, human segments) | 29.8 | 25.1 |
| Segment Robustness (human source, system segments) | 29.3 | 26.6 |
| System Robustness (ASR source, system segments) | 29.3 | 26.4 |
| System Robustness (ASR source with WER ≤ 0.5, system segments) | 29.4 | 26.6 |

(51) Int. Cl.
*G10L 15/04* (2013.01)
*G10L 15/06* (2013.01)
*G10L 15/16* (2006.01)
*G10L 15/28* (2013.01)

(58) Field of Classification Search
USPC .......................................................... 704/10
See application file for complete search history.

(56) References Cited

U.S. PATENT DOCUMENTS

2013/0144597 A1   6/2013   Waibel
2020/0175961 A1   6/2020   Thomson et al.
2021/0142789 A1*  5/2021   Gurbani .................. G10L 15/16

OTHER PUBLICATIONS

Cho, Eunah, et al., "Segmentation and Punctuation Prediction in Speech Language Translation Using a Monolingual Translation System", ISCA Archive, 2012, pp. 1-8.

Vaswani, Ashish, et al., "Attention Is All You Need", arXiv:1706.03762v5, Dec. 6, 2017, pp. 1-15.

Wan, David, et al., "Segmenting Subtitles for Correcting ASR Segmentation Errors", arXiv:2104.07868v1, Apr. 16, 2021, pp. 1-16.

International Search Report and Written Opinion issued in International Patent Application No. PCT/US2022/036469 mailed Oct. 20, 2022, 10 pages.

Li, Daniel, et al., "Sentence Boundary Augmentation for Neural Machine Translation Robustness", arxiv.org, Cornell University Library, 201 Olin Library Cornell University Ithaca, NY 14853, Oct. 21, 2020, XP081792258, 10 pages.

Di Gangi, Mattia, et al., "Robust Neural Machine Translation for Clean and Noisy Speech Transcripts", arXiv:1910.10238v1 [cs.CL] Oct. 22, 2019, 6 pages.

Liao, Junwei, et al., "Improving Readability for Automatic Speech Recognition Transcription", arXiv:2004.04438v1 [cs.CL] Apr. 9, 2020, 11 pages.

Tzoukermann, Evelyne, et al., "Evaluating Automatic Speech Recognition in Translation", Proceedings of AMTA 2018, vol. 2: MT Users' Track, 2018, pp. 294-302.

* cited by examiner

Fig. 2

Table 1

| Segment / Token | Human | System |
|---|---|---|
| Human | Baseline | Token Robustness |
| System | Segment Robustness | System Robustness |

Fig. 3A

Table 2

| Human  | I | checked | the | weather | — | this | evening | . | It | will | rain | tomorrow | . |
|---|---|---|---|---|---|---|---|---|---|---|---|---|---|
| System | I | checked | the | whether | . | This | evening | — | it | will | rein | tomorrow | . |

Fig. 3B

Table 3

| Gold De | Ich habe heute Abend das Wetter überprüft . | | | | | | Morgen wird es regnen . | | | |
|---|---|---|---|---|---|---|---|---|---|---|
| Human En | i | checked | the | weather | this | evening | it | will | rain | tomorrow |
| * System En | i | checked | the | whether | this | evening | it | will | rein | tomorrow |

Fig. 3C

Table 4

| Gold De | Ich habe heute Abend das Wetter überprüft . *(I have this evening)* | | | | | | Morgen wird es regnen . *(the weather checked . It will rain tomorrow .)* | | | |
|---|---|---|---|---|---|---|---|---|---|---|
| + Human En | i | checked | the | weather | this | evening | it | will | rain | tomorrow |
| ** System En | i | checked | the | whether | this | evening | it | will | rein | tomorrow |

Fig. 4

Table 5

| Training condition | HT | ASR |
|---|---|---|
| Baseline (human tokens and segments) | 33.6 | 26.5 |
| Token Robustness (ASR source, human segments) | 32.7 | 26.0 |
| Segment Robustness (human source, system segments) | 32.1 | 27.1 |
| System Robustness (ASR source, system segments) | 32.1 | 27.4 |
| System Robustness (ASR source with WER ≤ 0.5, system segments) | 32.3 | 27.6 |

Fig. 5
Table 6

| Training condition | HT | ASR |
|---|---|---|
| Baseline (human tokens and segments) | 30.3 | 25.4 |
| Token Robustness (ASR source, human segments) | 29.8 | 25.1 |
| Segment Robustness (human source, system segments) | 29.3 | 26.6 |
| System Robustness (ASR source, system segments) | 29.3 | 26.4 |
| System Robustness (ASR source with WER ≤ 0.5, system segments) | 29.4 | 26.6 |

INVERTED PROJECTION FOR ROBUST SPEECH TRANSLATION

CROSS-REFERENCE TO RELATED APPLICATIONS

This application claims the benefit of the filing date of U.S. provisional application No. 63/224,902, filed Jul. 23, 2021. The entire disclosure of the provisional application, including the appendices are expressly incorporated by reference herein.

BACKGROUND

Speech translation is an important field that becomes more relevant with every improvement to its component technologies of automatic speech recognition (ASR) and machine translation (MT). It enables exciting applications like live machine interpretation and automatic foreign-language subtitling for video content. Traditionally, translation systems have been trained with clean, well-structured text that is formed of source language and target language sentence pairs gathered from text documents. The source sentence is from the input language and the target sentence is in the language of interest. This can work well for translating written text, but translating speech in one language to text in another can be challenging for cascaded systems composed of speech, automatic transcription, and automatic translation, because errors from ASR and automatic punctuation are amplified as they pass through the translation system.

Such systems can suffer from three general issues. First, spoken language structure is different from written language structure and can include aspects like disfluencies and partial sentences. Second. ASR systems are not perfect and introduce errors in the stage from speech to source transcript. And third, mistakes from automatic punctuation systems can lead to unnatural sentence segments and boundaries. This can be especially pronounced in long form sentence scenarios, where there are multiple sentences (e.g., an audio file having at least a minute of speech or more). These problems can lead to poor translations and pose unique challenges for MT that are not readily addressed by current approaches.

BRIEF SUMMARY

Aspects of the technology are associated with building translation models, such as neural machine translation (NMT) models, which are designed to translate starting from speech. The machine translation should be robust to the issues described above, and particularly to errors and mistakes introduced by automatic punctuation. For instance, translation models can be adapted to speech by introducing actual lexical errors from ASR and segmentation errors from automatic punctuation into translation training data. An inverted projection approach is performed that projects automatically detected system segments onto human transcripts and then re-segments the gold translations to align with the projected human transcripts. This is able to overcome the train-test mismatch present in other training approaches. Testing has shown that the inverted projection approach can achieve gains of over 1 BLEU point over a baseline that is exposed to the human transcripts and segmentations.

According to one aspect of the technology, a method for training a machine translation model is provided. The method includes performing, by one or more processors of a computing system, automatic speech recognition on input source audio to generate a system transcript. The method aligns, by the one or more processors, a human transcript of the source audio to the system transcript, including projecting system segmentation onto the human transcript. Then the method comprises performing, by the one or more processors, segment robustness training of a machine translation model according to the aligned human and system transcripts; and performing, by the one or more processors, system robustness training of the machine translation model, including injecting token errors into training data.

DETAILED DESCRIPTION

Overview

The technology provides an approach to train translation models that are robust to transcription errors and punctuation errors. The approach includes introducing errors from actual ASR and automatic punctuation systems into the source side of the MT training data.

One approach to training a model that is robust to ASR errors is to collect short sentences, record people speaking those sentences, and then translating those sentences. This would enable training of a system that is robust to ASR errors and is relatively easy to work with because it yields well-formed pairs of sentences that fit easily into the traditional training setup. However, because such data is composed of individual sentences, it does not include punctuation errors that naturally occur in longer speaking sessions. This type of data is also artificial because it requires people to read a particular sentence and does not model real speech.

In contrast to a short-sentence approach, in order to train a more general model aspects of the technology involve processing longer speaking sessions such as design, entertainment and/or technology presentations (e.g., TED talks). In this case, the input may be the entire audio session, which could be, for example, over an hour long. The task would be to recognize the text, segment it into sentences, and match the transcripts with the corresponding translations. Being able to process this more general format of data will lead to a system that is robust to longform audio and will be better adapted to translating speech applications. Useful datasets include both International Workshop on Spoken Language Translation (IWSLT) and Workshop on Statistical Machine Translation (WMT) datasets.

By employing longform source audio documents, their corresponding human transcriptions, and translations of those transcriptions, it becomes possible to compare the performance of a baseline model trained on the human transcription with a model trained on source sentences derived from applying ASR transcription and automatic punctuation to the same audio.

As discussed further below, one aspect involves producing training data that captures the errors from automatic transcription and punctuation, which requires a non-trivial re-segmentation of the reference translation. Another aspect shows experimentally that it can be more important to expose the MT system to segmentation errors than lexical transcription errors when aiming for speech-robust machine translation.

Compounding errors from ASR are known to cause problems when cascaded into NIT. To improve a cascade's robustness to speech input, one can train the MT system with some combination of artificial errors, actual ASR output, or long-form segmentation errors. Each is discussed in turn.

Introducing artificial errors into the training set has the advantage of being efficient, and not necessarily tied to a specific ASR system. One can add Gaussian noise to the source embeddings or induce lexical substitutions that may be informed by phonetics. One could experiment with a noise model that can perform insertions, deletions and substitutions, but there may be little value in refining the substitutions to account for word frequency or orthographic similarity.

More relevant approaches are those that use actual ASR output. For instance, one could use ASR output to replace the source side of parallel text during training; however, this may result in unreliable training signals due to high word error rates (WER), such as on the order of 40% or more. However, given ASR training corpora (coupled audio-transcription pairs), one could build a robust MT system by training with the normal MT objective on MT corpora, plus a mixture of: (1) an adversarial objective that tries to bring encoder representations for ASR output close to those of human transcriptions; and (2) a normal MT objective that has ASR output as source and machine translations of human transcripts as target.

General System

Figure 1:
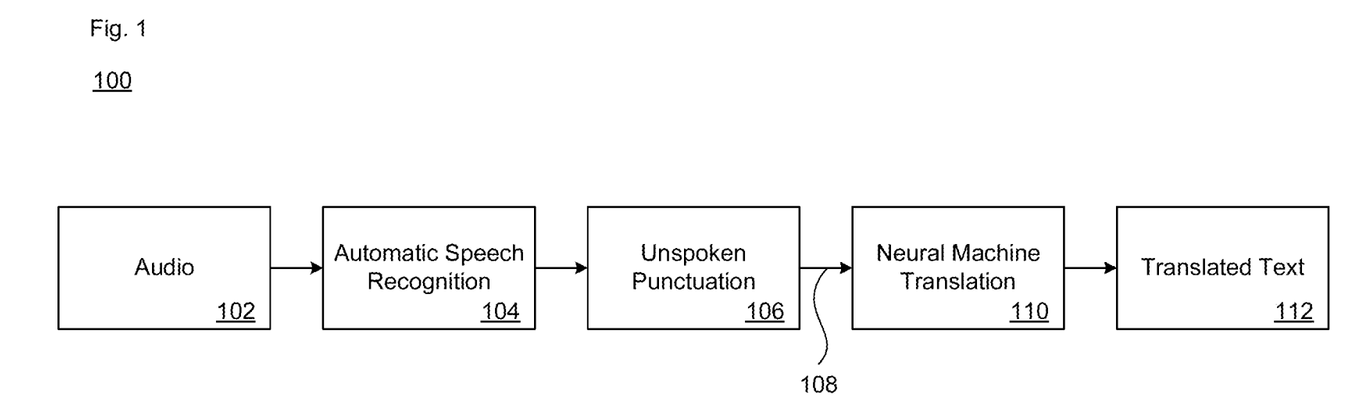
FIG. 1 illustrates an overall machine translation approach in accordance with aspects of the technology.

FIG. 1 illustrates a general architecture 100 for training an NMT model in accordance with aspects of the technology. Audio is obtained as shown in block 102. The audio may be a longform speech document that is several minutes or longer (e.g., 10-30 minutes, an hour or more). In one example the audio is retrieved from a database, which may contain IWSLT, WMT and/or other datasets. In another example, the audio may be streamed from a source, such as a live event (e.g., a TED talk, newscast, seminar, videoconference, etc.). The audio from block 102 is applied to block 104, which performs automatic speech recognition and generates a speech to text transcription. Next, at block 106, the text transcription output from ASR block 104 is processed, for instance to add punctuation, capitalization and/or sentence breaks. The output from unspoken punctuation block 106 is a set 108 of automatically recognized words grouped into automatically detected segments. The sentences can then be applied to an NMT model (or other type of machine translation model) at block 110. The NMT block 110 generates translated text as shown at block 112.

Each step in the pipeline can introduce errors. For instance, the ASR block may have soundalikes and other lexical errors. The unspoken punctuation block can cause incorrect capitalizations and sentence-internal punctuation. Another error unique to the long-form scenario is incorrect sentence breaks.

The machine translation model may employ a neural network such as a convolutional neural network (CNN) or a recurrent neural network (RNN), e.g., a bidirectional long short-term memory (Bi-LSTM) RNN. Alternatively or additionally, the model may employ a self-attention architecture. This may include an approach such as the Transformer, described in "Attention Is All You Need", by Vaswani et al., published on Dec. 6, 2017, which is incorporated by reference herein.

General Method

As noted above, one particular scenario of interest is a long-form scenario where human generated sentence boundaries for the input audio are not given at test time. The approach discussed herein for producing MT systems that are robust to automatic transcription errors is to introduce errors from the ASR system into the MT training data. The system is able to make use of both human (manual) and system (automated) transcript ions of the source audio.

When discussing the target-side of the training data, the term "gold" is used to indicate a trusted reference translation. While gold standard is a human translation of the human transcript, it could just as easily, and much less expensively, be a machine translation of the human transcript.

Transcription errors are divided into two categories: token and segment errors. A token error is any word that is transcribed incorrectly by ASR, such as a homophone substitution or the omission of a mumbled word. Meanwhile, segment errors are introduced by failing to correctly break the recognized text into sentence-like segments, A human transcription is expected to have error-free tokens and segments.

Figure 2:
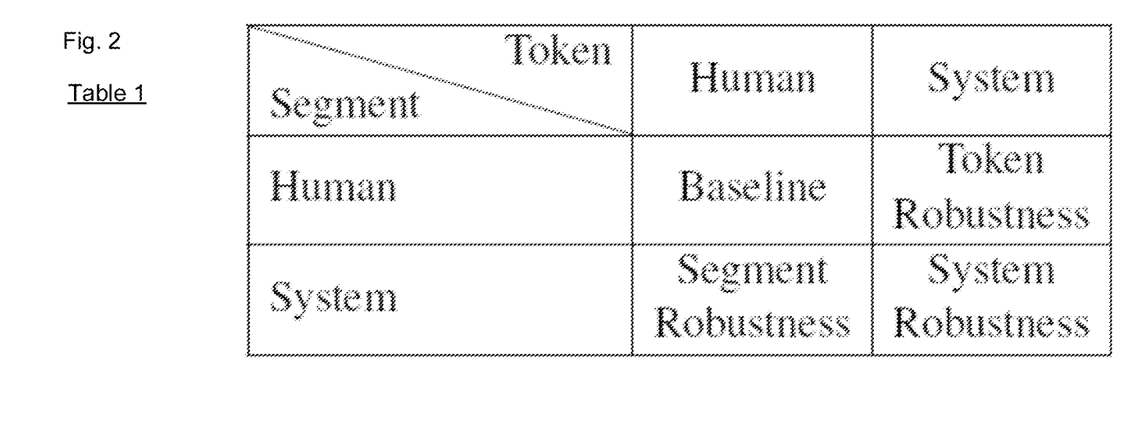
FIG. 2 illustrates a table showing a baseline and different ways to turn long-form data triples into robust training data in accordance with aspects of the technology.

Table 1 shown in FIG. 2 presents a baseline and three ways to turn long-form Audio-Transcript-Translation triples into robust training data suitable for fine-tuning an NMT model. Training models with human tokens and segments is the common translation mode, so it is marked in Table 1 as "baseline". Training with system tokens and human segments can result in token robustness.

In the case of long-form ASR, the human segments can be projected onto the ASR output. This is an effective approach for exposing the training model to token errors from ASR. However, this approach can result in train-test mismatch because the human segments seen during training will not be available at inference time.

Introducing segment errors alone results in Segment Robustness, while segment and token errors together result in System Robustness; that is, MT that is robust to the complete long-form transcription pipeline. It will be shown below how one can project system segments onto the source and target text, which is referred to herein as an inverted projection.

Levenshtein Projection

A key component to all of the approaches in Table 1 is an alignment between the system (ASR) transcription and a human transcription of the same long-form audio. This can be accomplished by employing a token-level, case-insensitive Levenshtein alignment of the two transcripts. The Levenshtein alignment is monotonic, parameter-free, and its dynamic programming algorithm is fast enough to be easily applied to very long sequences.

Figure 3A:
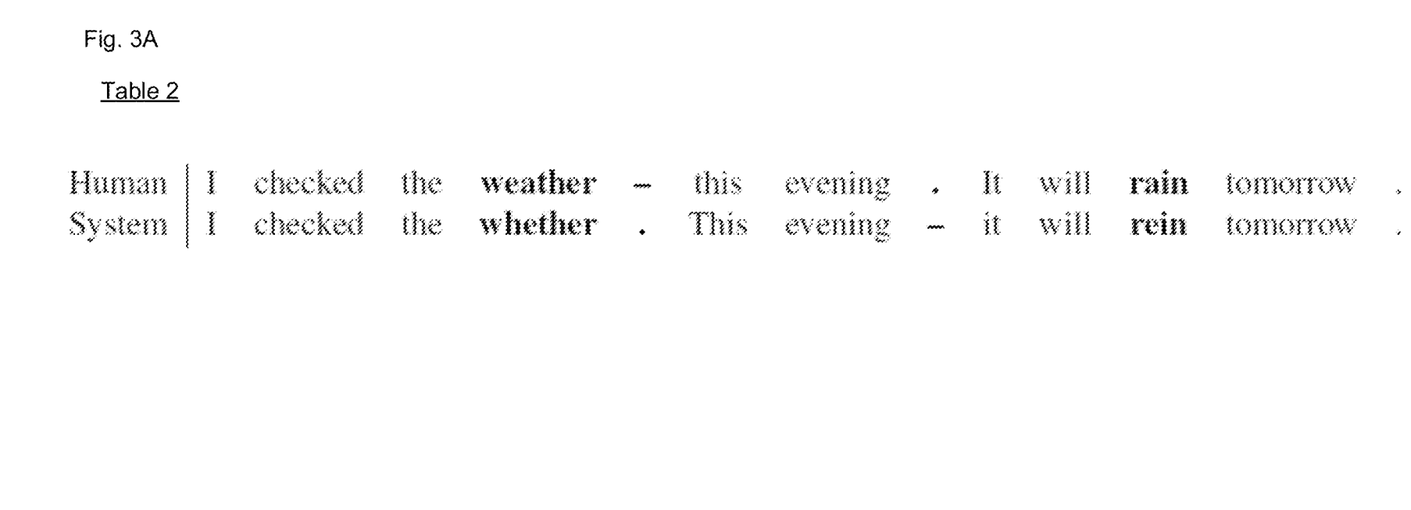
FIG. 3A illustrates an example alignment for human and system transcriptions in accordance with aspects of the technology.

An example alignment is shown in Table 2 of FIG. 3A. This is an example of human and system transcriptions, with the system having both lexical and segmentation errors. The Levenshtein alignment is given by column alignment, with "—" indicating insertion or deletion.

By tracking the alignment of tokens immediately before segment boundaries (always end-of-sentence periods in this example), one can project segment boundaries from one transcription to another, which allows for production of the various entries in Table 1, as we describe in more detail in the following subsections.

Token Robustness Training

A conventional approach to training on ASR sentences is to Levenshtein-align the human transcript to the system transcript, and project the human sentence boundaries onto ASR. Since each human transcript is already paired with a gold standard translation, this projection makes it easy to align each projected ASR segment with a gold translation. The model is then trained with (projected-ASR-source, gold translation) pairs. The Token Robustness training pair derived from the running example from Table 2 is shown in Table 3 of FIG. 3B: Token Robustness (*). The resulting, source sentence, marked with *, has ASR token errors ("whether" and "rein") but human segment boundaries. The Levenshtein alignment projects system tokens onto human segments. The punctuation has been grayed out and the text lowercased to show the actual English text used in training.

The main advantage of this approach is that it uses the gold translations as written. Thus, the model would train on well-formed translations. However, it can suffer from a disadvantage, which is that the model would only train on human segment boundaries. At test time, the model will translate according to system segment boundaries, resulting in a train-test mismatch. Experimental results discussed below demonstrate that this can be a serious drawback. In fact, when the WER is low, the token errors present in Token Robustness training would be ignored by the model since they are overwhelmed by segment errors. The following section introduces an approach to overcome this issue.

Segment Robustness Training

To address the segment-boundary train-test mismatch present in Token Robustness training, one can invert the projection and use system segments. That is, the system segment boundaries are projected onto the human transcription.

System segments are derived from automatic punctuation and sentence splitting of the system transcription. As with Token Robustness, the system Levenshtein-aligns the human transcript to the system transcript. But here it projects the system segmentation onto the human transcript. Unlike the Token Robustness scenario, it is non-trivial to get corresponding, segment boundaries for the gold-standard translations when training for Segment Robustness.

One could perform a statistical word alignment between the human transcription and its translation to determine word-level interlingual semantic correspondence, but in similar situations such as prefix training for simultaneous translation it has been shown that that has not resulted in improvements over a simple proportional length-based heuristic. Therefore, one aspect of the technology uses human-transcript-to-translation length ratios (in tokens) to segment the gold translations so that their new segment lengths match the projected human source segment lengths.

Finally, the system trains on (projected-human-source, projected-gold-translation) pairs. Here, the boundaries are determined by automatic punctuation on ASR output, rather than from introducing boundary errors at random.

Figure 3B:
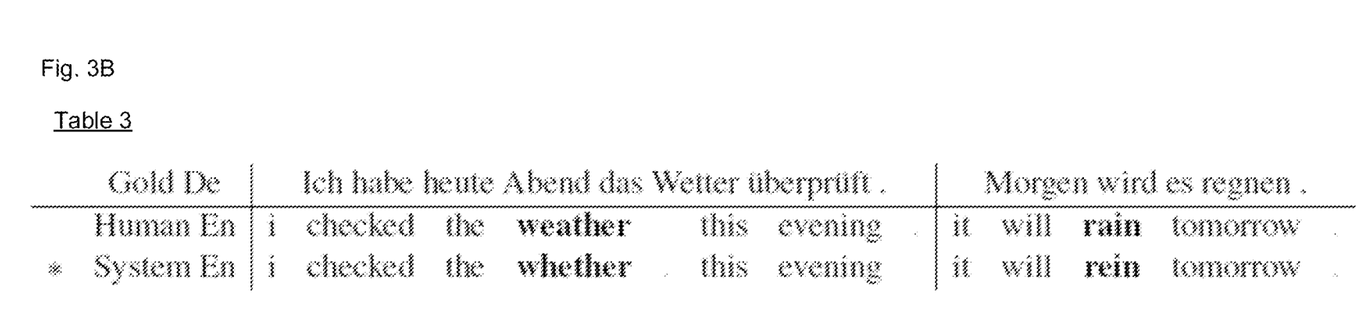
FIG. 3B illustrates a Token Robustness training pair in accordance with aspects of the technology.
Figure 3C:
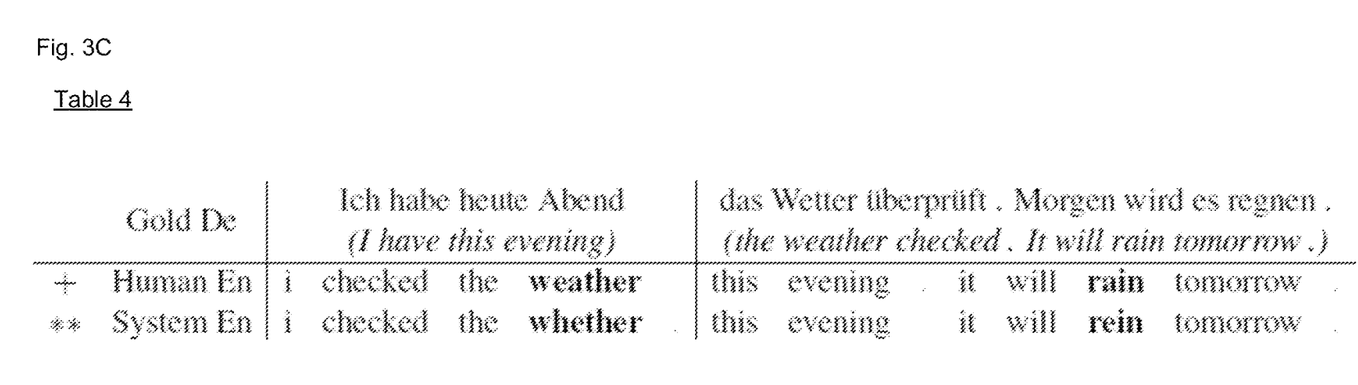
FIG. 3C illustrates Segment Robustness and System Robustness in accordance with aspects of the technology.

Table 4 of FIG. 3C shows the resulting human English and gold German segments for the running example from FIGS. 3A and 3B, having Segment Robustness (+) and System Robustness (**). The source row marked with is used in Segment Robustness training. The Levenshtein alignment projects human tokens onto system segments, and then human-transcript-to-translation length ratios are used to align the German tokens to both. As above, the punctuation has been grayed out and text lowercased to show the actual English text used in training. To illustrate the length-ratio token alignment, one can see that the total token length of the human English is 12, and the gold German is 13. The English is segmented into lengths 4 and 8, meaning the German is segmented to lengths $4/12 \cdot 13 = 4:33 \approx 4$ and $8/12 \cdot 13 = 8:66 \approx 9$.

The resulting references will not always semantically match the content in the new source segments. In this example, they do not: an English gloss of the German shows that the semantics have diverged. But they are often close enough, and the benefit of exposure to realistic source fragments can outweigh the cost of occasional semantic misalignment. Furthermore, this robustness data may only be used to fine-tune a system that has seen many semantically valid pairs.

System Robustness

In Segment Robustness training, the inverted projection approach was applied to the human transcripts. This provides a measure of the improvement that can be achieved by just adjusting the training set's source segment boundaries so that they match what the model will see during inference. Next, the architecture builds upon this approach by injecting the ASR token errors into the training data as well.

Training a model that sees both system token errors and segment boundary errors involves a slight variation on the setup in the prior section. Here, the system uses the same alignment approach, but it is used only to get projected gold translations since the system transcripts already have system segment boundaries. The model is then trained with (system source, projected-gold-translation) pairs.

A main advantage of this approach is that the source side exactly matches the pipeline, completely bridging the train-test mismatch. However, the system segments may lead to fragmented or semantically misaligned reference sentences. Table 4 marks the source row used for System Robustness training with: **.

Experimental Setup

This section discusses an exemplary experimental setup, including the data set, baseline and model fine-tuning.

Data

The setup used the IWSLT English to German (EnDe) speech translation scenario. In particular, the IWSLT 2018 EnDe training data was used, including both the official training set and the leftover TED talks not included in any other test set, for a total of about 2400 talks and 0.25M sentence pairs. It was found to be beneficial to also include the 4.6M sentence pairs of the WMT 2018 EnDe corpus during training to increase the feasible MT model size and MT accuracy. For the IWSLT data, the ground truth transcripts and translations were scraped from the TED talks website directly, because it was found that the official IWSLT datasets omitted transcriptions for many sentences. In view of interest in longform scenarios, all sentences were retained.

The models are evaluated on past IWSLT spoken language translation test sets. IWSLT tst2014 is used as a dev set, which includes 14 TED talks and about 1,200 sentences. Tests are on IWSLT tst2015, which includes 12 TED talks totaling about 1,200 sentences. Punctuated ASR transcriptions are obtained from a publicly available Speech-to-Text API from Google Cloud. This achieves a WER of 5.5% on tst2015 ignoring case and punctuation.

A sentence breaker is run on the punctuated source to determine the segments to be translated by NMT. Since these segments need not match the reference sentence boundaries, especially when punctuation is derived automatically on ASR output, Levenshtein alignment as described above is used to align the translation output with the gold-standard translation's segments before evaluating quality with case-sensitive BLEU. All models are trained and tested on lowercased and unpunctuated versions of the source, as doing so is known to improve robustness to ASR output.

Baseline

For all experiments, a Transformer model is used with a model dimension of 1024, hidden size of 8192, 16 heads for multihead attention, and 6 layers in the encoder and decoder. The models are regularized using a dropout of 0.3 and label smoothing of 0.1. These settings were selected through hyper-parameter tuning on the IWSLT dev set.

As a baseline, a model is trained that includes a mix of WMT and human-transcribed IWSLT data, but with no ASR-transcribed IWSLT data. During training, for each batch, 90% of data is sampled from WMT and 10% is sampled from IWSLT. This mixture was chosen based on the best performance of a grid-search of weighting between these two datasets evaluated on the IWSLT dev set. Because this baseline has already seen the human transcripts and translations of the IWSLT data, it has already adapted its domain to both news and TED data. By ensuring that this baseline has already been adapted, the system is able to isolate the effects of ASR errors and segmentation errors on the fine-tuned models. The model is trained using pairs of (source, target) sentences, where target German translations are untouched, retaining case and punctuation.

Model Fine-Tuning

Starting from the baseline, the model is fine-tuned on data from each scenario, each time starting from the same checkpoint of the baseline. The best-performing checkpoint of each fine-tuning experiment is chosen based on the BLEU score on the dev set, and this checkpoint is used to evaluate on the test set. Fine-tuning is about 35× faster than training from scratch and converges after running through less than 5 epochs of the IWSLT data (≈0.25M sentence pairs). Each experiment can be repeated multiple times to account for any variations in the runs.

Filtering

All of the processing steps described so far have included all of the ASR sentences, regardless of their quality. However, some ASR sentences have high WER compared with the human transcripts. This can happen, for example, the ASR transcribes a video playing in the background that was not included in the gold transcript. These examples can be so egregious that they can confuse the model. To filter the dataset, all ASR sentences are removed from the training set that have a WER≥50% as compared with the human transcripts. This removes approximately 4% of the training data.

The sentences with WER between 0.0 and 0.5 are useful because they demonstrate ASR errors relative to human transcripts but not egregious errors. Results on this filtered set are included as an additional row in the results tables. However, it is noted that the filtering is only applied to the training data and is not applied on the test set.

Example Results

Figure 4:
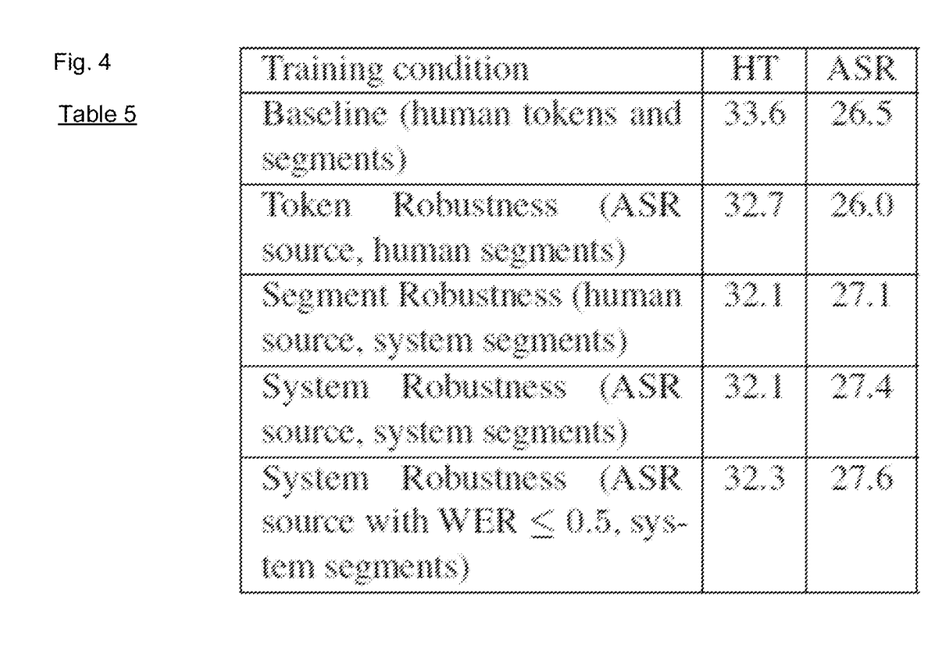
FIG. 4 illustrates a table showing experimental results in accordance with aspects of the technology.

Table 5 in FIG. 4 compares the (IWSLT-based) results of the different combinations of segments and tokens from Table 1. Here, "HT" stands for "human transcript". All numbers represent the translation BLEU, and each score is the average across 3 runs. The ASR WER on the test sentences in this example is 5.5%.

For the test set, automatic punctuation is first applied and used to split the ASR output into sentences, and then it is stripped of case and punctuation. Sentences are translated one at a time with whatever system is under test. The checkpoint can be chosen according to the dev set for each scenario, and the resulting BLEU scores on the test set are presented in the "ASR" column. For completeness, the BLEU score is also computed on the IWSLT human transcripts using the same model and checkpoint and reported it in the "HT" column. As expected, this "HT" score decreases with increasing adaptation to the system tokens and segments, but this does not affect the results because during inference the system will only be applied to ASR, sentences with automatic punctuation.

As shown in Table 5, the baseline, trained from scratch using the human tokens and human segments (WMT IWSLT), achieves a score of 26.5 BLEU points on the ASR set. As described in the scenario above, this baseline training uses only 10% IWSLT data. Since the fine-tuning experiments use 100% IWSLT data, those models are arguably more adapted to the TED domain, which could contribute to any improvements over the baseline. To control for this, an additional model was fine-tuned on 100% human token, human segment IWSLT data, but this yielded no improvement over the baseline, likely because the baseline has already seen this IWSLT data during training. Thus, the results of this experiment are not included in Table 5.

All of the fine-tuning experiments in Table 5 start with the baseline from the first row, which was trained without knowledge of the ASR transcripts. The Token Robustness experiment starts from the baseline and fine-tunes on ASR; it shows no improvement compared to the baseline, which indicates that the ASR errors are sufficiently subtle compared to the segment errors so that the model cannot adapt to them. On the other hand, the last 3 rows demonstrate significant gains when the text is projected using the system segments. In particular, the System Robustness experiment shows an improvement over the Segment Robustness, and the best results are achieved with System Robustness when removing ASR transcripts with high WER. This yields a gain of more than 1 BLEU point over the baseline. This indicates that, once the train-test segment mismatch has been corrected for, the model is able to adapt to and correct the subtle ASR errors. These improvements indicate the value of making the segmentation errors visible to NMT training using the two steps of projecting source and re-aligning translation.

The fact that the Token Robustness model does not improve over the baseline may indicate that there are very few lexical errors since the ASR model used for English is very robust, with a mean WER of 5.5%. This is true even when removing high WER ASR sentences during training (those results not included in Table 5).

Other Results

To test the generalization of the approach, the models trained on the IWSLT data were applied to another dataset consisting of 88 English videos selected from YouTube. The videos were selected to have a single speaker, and were truncated to a length of roughly 1 minute, perhaps interrupting a sentence. Each of the 920 sentences in the human transcription of these videos was professionally translated into German. The results are shown in Table 6 of FIG. 5. Here, the ASR WER on the test sentences is 9.0%.

Figure 5:
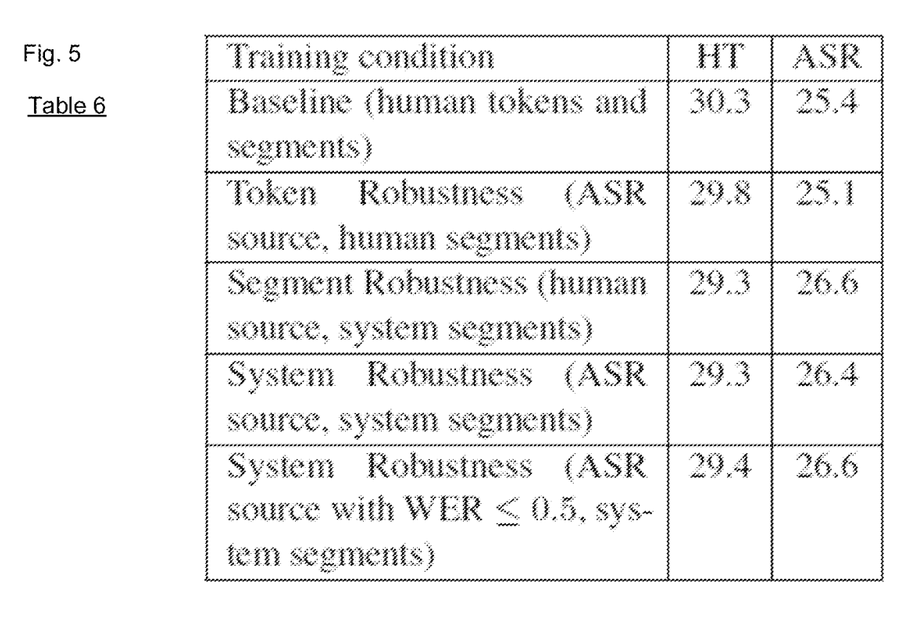
FIG. 5 illustrates another table showing experimental results in accordance with aspects of the technology.

No new models were trained here. Rather, every line in Table 6 is a corresponding system from Table 5. For each of the experiments, the corresponding model trained on IWSLT were taken and tested on this YouTube EnDe test set. This enables a determination of the generalization ability of the approach.

According to Table 6, the model performs remarkably similarly on this YouTube dataset. In particular, the improvement over the baseline of the System Robustness in the last row is about 1.2 BLEU points, comparable to the 1.1 BLEU point improvement in Table 5.

Note that because the models were fine-tuned on the IWSLT ASR dataset starting from a mix of WMT and IWSLT, there is a domain mismatch between this training data and the YouTube testing data. Nevertheless, the System Robustness approach shows a clear improvement. Thus, one would expect that if a model were trained directly on YouTube data, even higher BLEU scores would be seen.

Example Computing Architecture

Figure 6A:
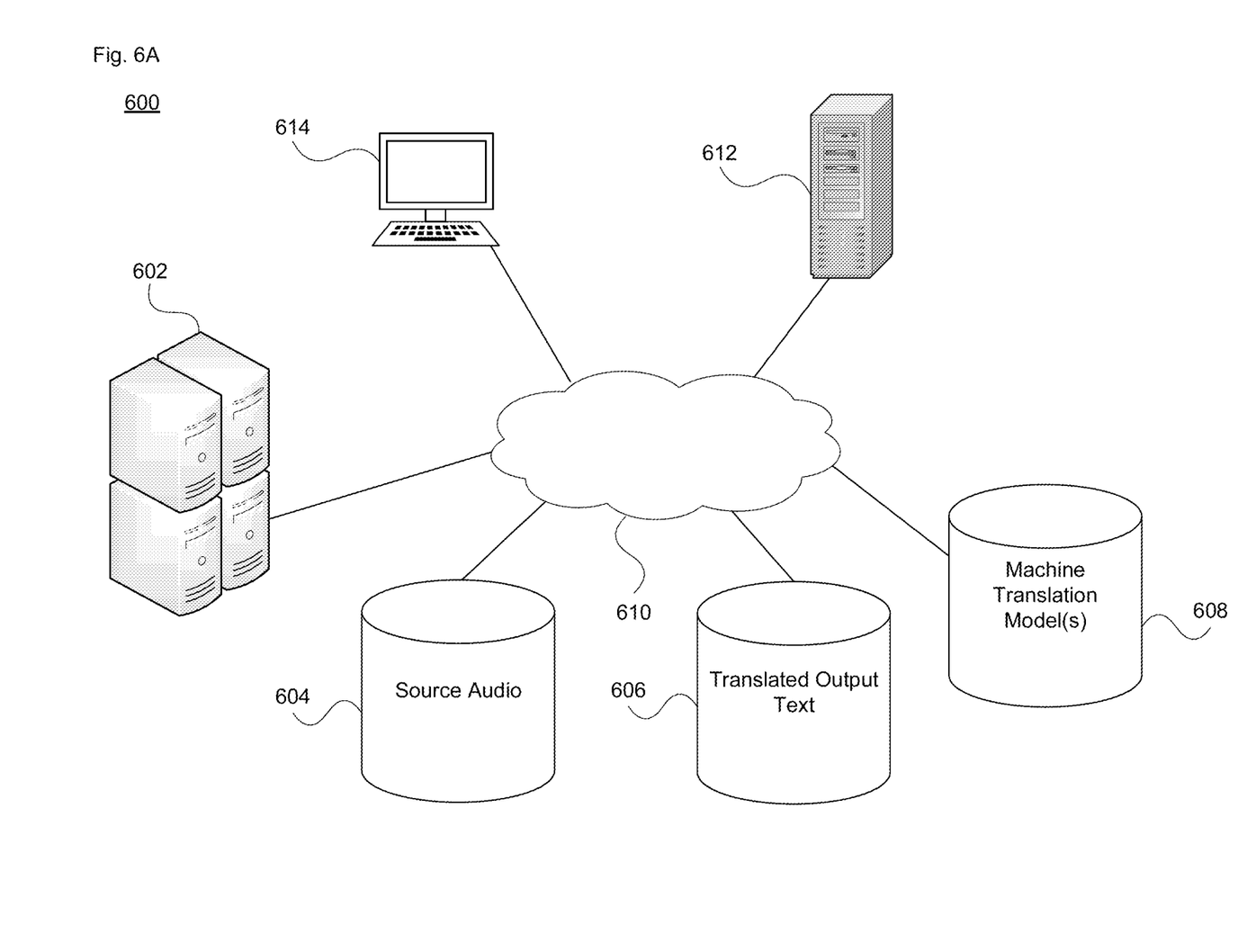
FIGS. 6A-B illustrate a system for use with aspects of the technology.
Figure 6B:
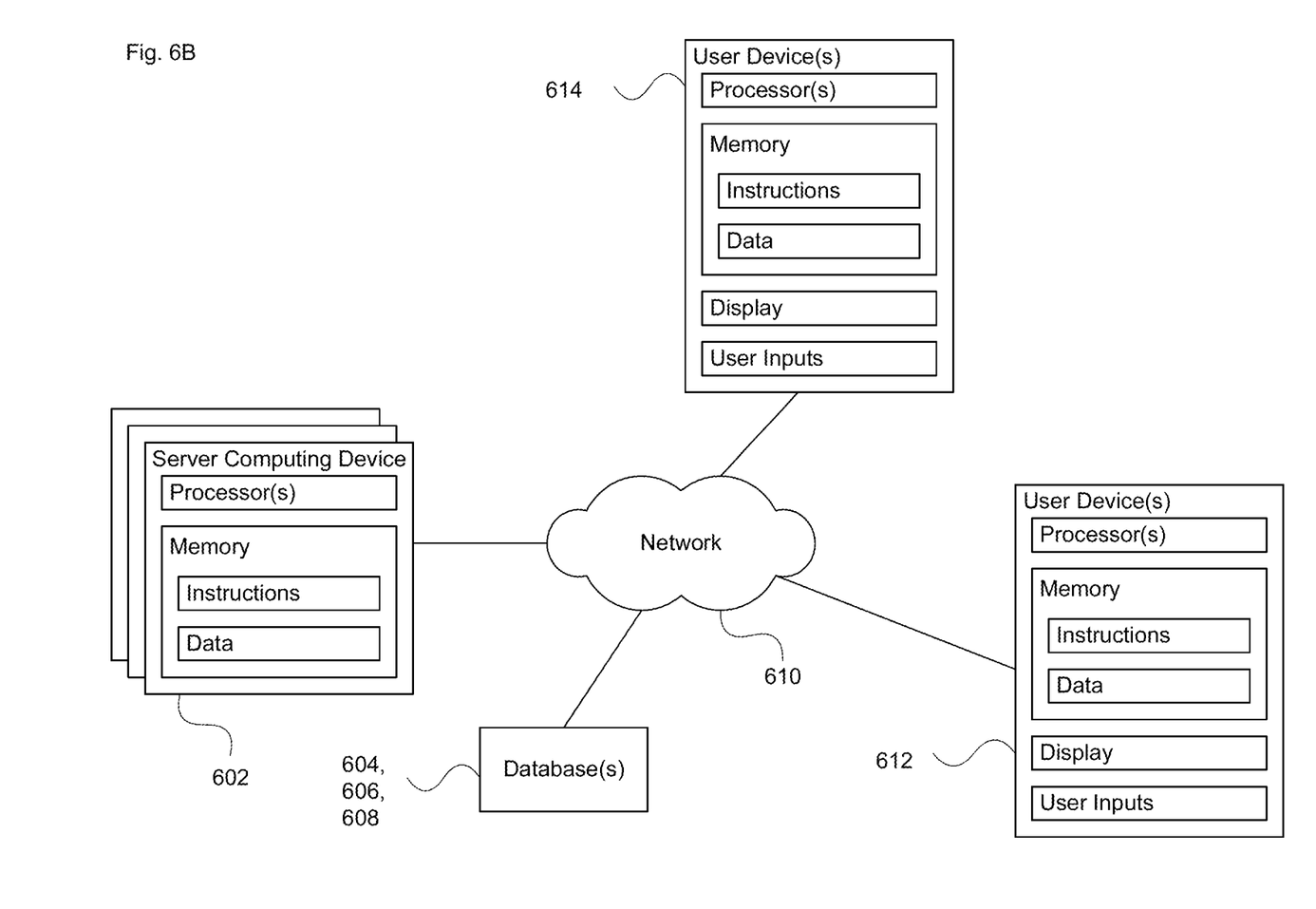

TPU, GPU, CPU or other computing architectures can be employed to implement aspects of the technology in accordance with the features disclosed herein. One example computing architecture is shown in FIGS. 6A and 6B. In particular, FIGS. 6A and 6B are pictorial and functional diagrams, respectively, of an example system 600 that includes a plurality of computing devices and databases connected via a network. For instance, computing device(s) 602 may be a cloud-based server system. Databases 604, 606 and 608 may store, e.g., a corpus of source audio files with or without human transcriptions, a corpus of translated output text, and one or more machine translation models (such as the Transformer and/or RNN or CNN models), respectively. The server system may access the databases via network 610. One or more user devices or systems may include a computing system 612 and a desktop computer 614, for instance to provide source audio and/or other information to the computing device(s) 602.

As shown in FIG. 6B, each of the computing devices 602 and 612-614 may include one or more processors, memory, data and instructions. The memory stores information accessible by the one or more processors, including instructions and data (e.g., machine translation model, parallel corpus information, feature extractors, etc.) that may be executed or otherwise used by the processor(s). The memory may be of any type capable of storing information accessible by the processor(s), including a computing device-readable medium. The memory is a non-transitory medium such as a hard-drive, memory card, optical disk, solid-state, etc. Systems may include different combinations of the foregoing, whereby different portions of the instructions and data are stored on different types of media. The instructions may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance.

The processors may be any conventional processors, such as commercially available GPUs, CPUs, TPUs, etc. Alternatively, each processor may be a dedicated device such as an ASIC or other hardware-based processor. Although FIG. 6B functionally illustrates the processors, memory, and other elements of a given computing device as being within the same block, such devices may actually include multiple processors, computing devices, or memories that may or may not be stored within the same physical housing. Similarly, the memory may be a hard drive or other storage media located in a housing different from that of the processor(s), for instance in a cloud computing system of server 602. Accordingly, references to a processor or computing device will be understood to include references to a collection of processors or computing devices or memories that may or may not operate in parallel.

The data, such as source audio files or translated output text, may be operated on by the system to train one or more MT models. This can include filtering of the dataset, iii which selected ASR sentences are removed from the training set that have a AVER above a certain threshold (e.g., 50%, or more or less) as compared with the human transcripts. The trained models may be used on stored or live (e.g., streamed) audio input to provide translated text to one or more users, for instance users of computers 612 and/or 614.

The computing devices may include all of the components normally used in connection with a computing device such as the processor and memory described above as well as a user interface subsystem for receiving input from a user and presenting information to the user (e.g., text, imagery and/or other graphical elements). The user interface subsystem may include one or more user inputs (e.g., at least one front (user) facing camera, a mouse, keyboard, touch screen and/or microphone) and one or more display devices (e.g., a monitor having a screen or any other electrical device that is operable to display information (e.g., text, imagery and/or other graphical elements). Other output devices, such as speaker(s) may also provide information to users.

The user-related computing devices (e.g., 612-614) may communicate with a back-end computing system (e.g., server 602) via one or more networks, such as network 610. The network 710, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 602 may include one or more server computing devices having a plurality of computing devices, e.g., a load balanced server farm or cloud computing system, that exchange information with different nodes of a network for the purpose of receiving, processing and transmitting the data to and from other computing devices. For instance, computing device 602 may include one or more server computing devices that are capable of communicating with any of the computing devices 612-614 via the network 610.

Figure 7A:
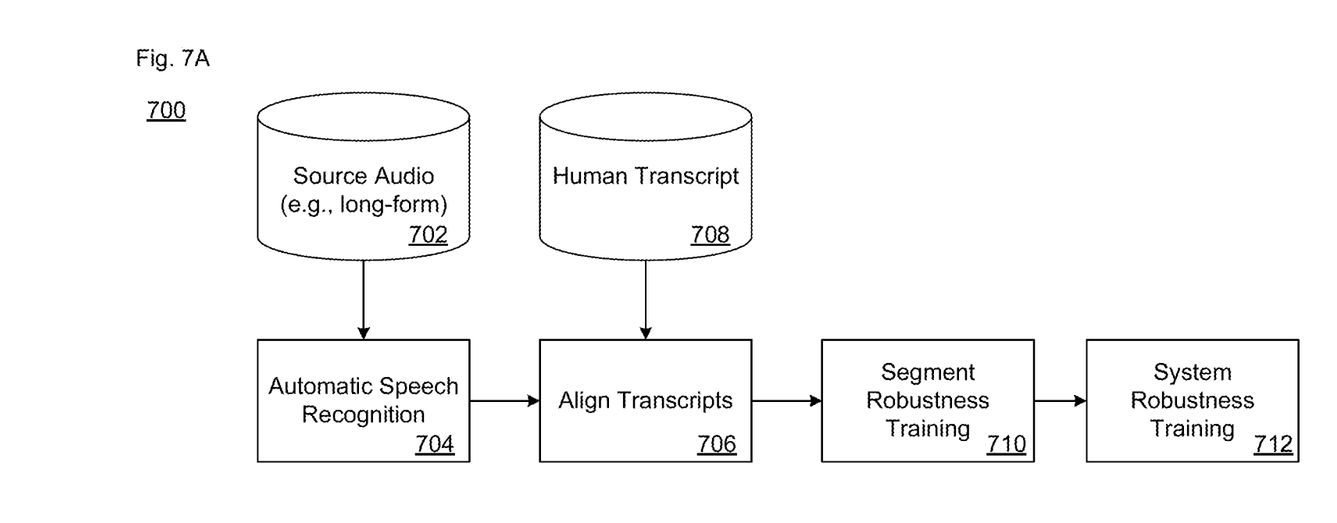
FIG. 7A illustrates an approach for training a model in accordance with aspects of the technology.

FIG. 7A illustrates an example 700 to train a machine translation model. As shown in block 702, source audio such as long-form audio, may be stored in a database. For instance, the long-form audio may be a design, entertainment or technology presentation, a speech, hearing, news report, etc. The source audio may be stored as a WAV file, although other formats such as MP3, RIFF, AAC, WMA or the like could be used. The source audio is applied to automatic speech recognition block 704 in order to generate a speech-to-text transcription (a system transcript) in the same language as the long-form audio file.

At block 706, the system aligns the human transcript 708 to the system transcript. This may be done via a Levenshtein alignment approach as discussed above, including projecting the system segmentation onto the human transcript. The human-transcript-to-translation length ratios (in tokens) can be used to segment the gold translations so that their new segment lengths match the projected human source segment lengths. Next, at block 710, segment robustness training is performed, e.g., by training the model on (projected-human-source, projected-gold-translation) pairs. By way of example, the boundaries can be determined by automatic punctuation on the ASR output. Then, at block 712, system robustness training is performed with (system source, projected-gold-translation) pairs, for instance by injecting the ASR token errors into the training data. Upon completion of system robustness training 712, the model has been trained (and can be stored as shown in block 608 of FIG. 6A).

Figure 7B:
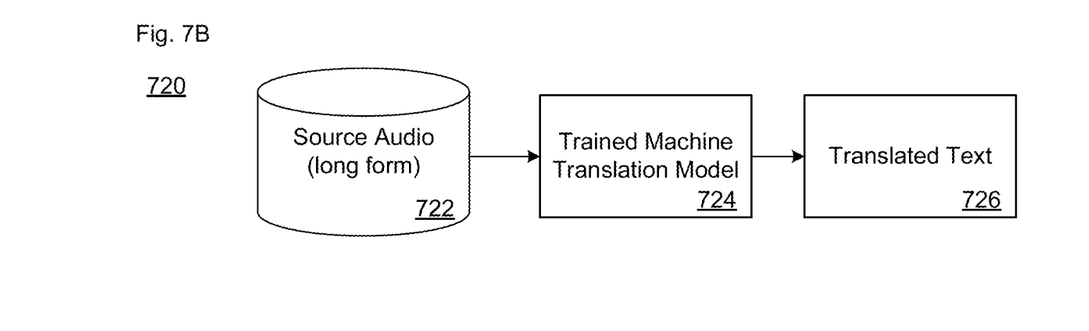
FIG. 7B illustrates using a trained model in accordance with aspects of the technology.

FIG. 7B illustrates an example 720 of using the trained model. One or more source audio files (e.g., long-form audio files) in block 722 are applied to a trained machine translation model at block 724. The output from the model is translated text 726, which is in a different language than the original language. The translated text can be used in a variety of applications, including live machine interpretation, automatic foreign-language subtitling (e.g., for video content), etc. The translated text can be evaluated via a comparison against a baseline translation (e.g., a human-created gold translation).

Figure 8:
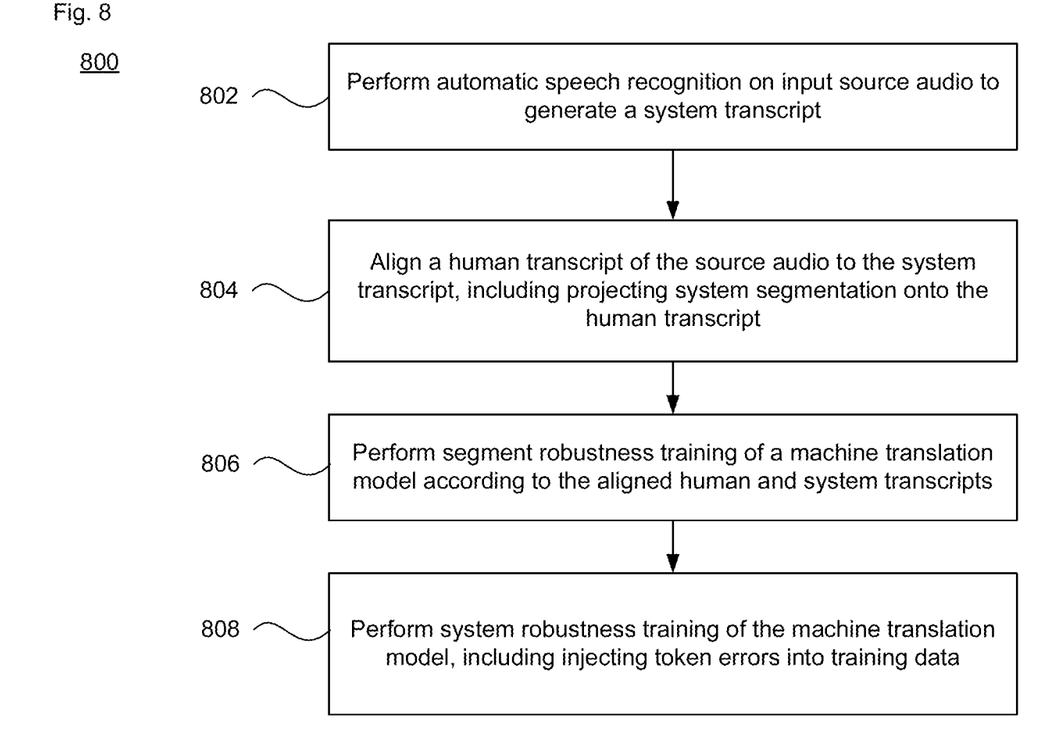
FIG. 8 illustrates a method in accordance with aspects of the technology.

FIG. 8 illustrates a method 800 in accordance with aspects of the technology, which involves training a machine translation model. As shown in block 802, the method includes performing, by one or more processors of a computing system, automatic speech recognition on input source audio to generate a system transcript. At block 804, the method aligns, by the one or more processors, a human transcript of the source audio to the system transcript, including projecting system segmentation onto the human transcript. Then at block 806 the processor(s) performs segment robustness training of a machine translation model according to the aligned human and system transcripts. And at block 808 the processor(s) performs system robustness training of the machine translation model, including injecting token errors into training data.

As discussed above, to aid text-based translation models to adapt to speech data, the technology introduces an inverted projection approach that projects automatically detected system segments onto human transcripts and then re-segments the gold translations to align with the projected human transcripts. Thus, models can be trained that are robust and are able to handle punctuation that occurs throughout a sentence, not just at the end of a sentence. This approach overcomes the train-test mismatch present in previous attempts to train on long-form ASR output by exposing MT training to both token and segment errors, exactly matching the source transcription pipeline used at test time.

Test results demonstrate a gain of over 1 BLEU point on both IWSLT data and YouTube data.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented method for training a machine translation model, the method comprising:
performing, by one or more processors of a computing system, automatic speech recognition on input source audio to generate a system transcript;
aligning, by the one or more processors, a human transcript of the source audio to the system transcript, including projecting system segmentation onto the human transcript;
performing, by the one or more processors, segment robustness training of the machine translation model according to the aligned human and system transcripts; and
performing, by the one or more processors, system robustness training of the machine translation model, including injecting token errors into training data.

2. The method of claim 1, wherein aligning the human transcript of the source audio to the system transcript comprises performing a token-level, case-insensitive alignment of the human transcript and the system transcript.

3. The method of claim 2, wherein the alignment is monotonic.

4. The method of claim 2, wherein the alignment is a Levenshtein alignment.

5. The method of claim 1, wherein for the alignment a human-transcript-to-translation length ratio is used to segment a gold translation so that new segment lengths of the gold translation match projected human source segment lengths.

6. The method of claim 1, further comprising tracking alignment of tokens immediately before segment boundaries.

7. The method of claim 6, further comprising projecting segment boundaries from one transcription to another transcription.

8. The method of claim 1, wherein performing automatic speech recognition on the input source audio to generate the system transcript includes running a sentence breaker on a punctuated version of the source audio to determine segments to be translated.

9. The method of claim 1, wherein training the machine translation model is performed on a combination of statistical machine translation and human-transcribed datasets.

10. The method of claim 9, further comprising choosing a mixture between the statistical machine translation and human-transcribed datasets based on performance of a grid-search of weighting between the datasets.

11. The method of claim 9, further comprising filtering the datasets to remove sentences from the system transcript having a word error rate above a determined threshold.

12. The method of claim 1, wherein the input source audio comprises one or more longform speech documents that are at least a minute in length.

13. A computer system configured to train a machine translation model, the computer system comprising:

memory configured to store input source audio comprising one or more longform speech documents that are at least a minute in length; and one or more processors operatively coupled to the memory, the one or more processors being configured to implement a neural network to:

perform automatic speech recognition on the input source audio to generate a system transcript;

align a human transcript of the input source audio to the system transcript, including projecting system segmentation onto the human transcript;

perform segment robustness training of the machine translation model according to the aligned human and system transcripts; and perform system robustness training of the machine translation model, including injecting token errors into training data.

14. The computer system of claim 13, wherein alignment of the human transcript of the source audio to the system transcript is performed via a token-level, case-insensitive alignment of the human transcript and the system transcript.

15. A computer-implemented method, comprising:

receiving, by one or more processors, a source audio file in a first language;

applying, by the one or more processors, the source audio file to a machine translation model; and outputting, by the one or more processors, text of the source audio file translated into a second language different from the first language;

wherein the machine translation model has been trained by:

performing automatic speech recognition on input source audio to generate a system transcript;

aligning a human transcript of the input source audio to the system transcript, including projecting system segmentation onto the human transcript;

performing segment robustness training of the machine translation model according to the aligned human and system transcripts; and performing system robustness training of the machine translation model, including injecting token errors into training data.

16. The method of claim 15, wherein the source audio file is a longform speech document at least a minute in length.

17. The method of claim 16, wherein the source audio file is streamed from a live event.

18. The method of claim 15, wherein outputting the text into the second language is performed for a live machine interpretation application.

19. The method of claim 15, wherein outputting the text into the second language is performed for an automatic foreign-language subtitling application.

20. The method of claim 15, further comprising comparing the translated text in the second language against a baseline translation in the second language.

* * * * *